United States Patent
Hikima et al.

(10) Patent No.: US 6,466,533 B2
(45) Date of Patent: Oct. 15, 2002

(54) PREPIT DETECTION UNIT

(75) Inventors: Hiroshi Hikima; Junji Tanaka, both of Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/021,066

(22) Filed: Dec. 19, 2001

(65) Prior Publication Data

US 2002/0048251 A1 Apr. 25, 2002

Related U.S. Application Data

(63) Continuation of application No. 09/421,856, filed on Oct. 20, 1999, now Pat. No. 6,337,838.

(30) Foreign Application Priority Data

Oct. 21, 1998 (JP) ............................................. 10-299679
Sep. 10, 1999 (JP) ............................................. 11-256763

(51) Int. Cl.$^7$ ................................................ G11B 3/90
(52) U.S. Cl. ................................ 369/53.31; 369/127.07
(58) Field of Search .......................... 369/44.25, 44.26, 369/44.29, 44.32, 44.34, 44.35, 47.25, 47.26, 47.27, 47.28, 47.31, 47.35, 53.34, 124.07, 124.08, 53.31

(56) References Cited

U.S. PATENT DOCUMENTS 4,751,695 A * 6/1988 Kaku et al. ............... 369/44.26
5,859,820 A * 1/1999 Nagasawa et al. ........ 369/44.26
6,091,699 A * 7/2000 Nakane et al. ........... 369/44.34

* cited by examiner

*Primary Examiner*—Paul W. Huber
(74) *Attorney, Agent, or Firm*—Sughrue Mion, PLLC

(57) ABSTRACT

A prepit detection unit for detecting prepits in an optical recording and reproducing apparatus for recording and reproducing information on a recordable, optical record medium including preinformation such as address information in a prepit form. In the prepit detection unit, for first and second divisional RF signals output from a pickup being divided into a first divisional light reception part and a second divisional light reception part by a division line optically parallel to the tangential direction of an information track for receiving reflected light from the optical record medium, mark sections and space sections are clamped by potential correction circuits and a difference is found by a radial push-pull circuit.

23 Claims, 8 Drawing Sheets

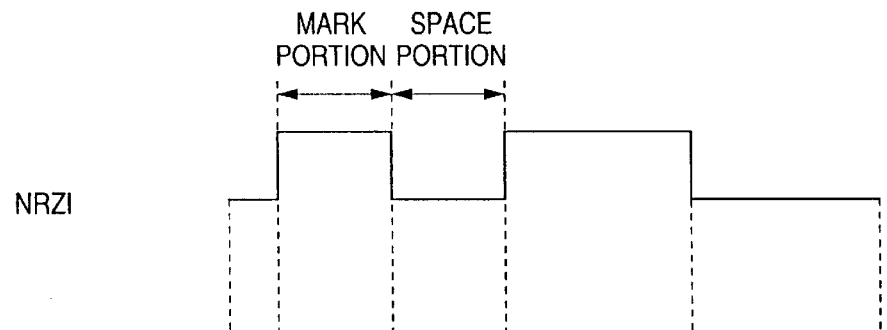

LPP EXISTENCE PORTION

LPP EXISTENCE PORTION

PREPIT DETECTION UNIT

This is a continuation of application Ser. No. 09/421,856 filed Oct. 20, 1999, now U.S. Pat No. 6,337,838 the disclosure of which is incorporated herein by reference.

BACKGROUND OF THE INVENTION

1. Field of the Invention

This invention relates to a prepit detection unit for detecting prepits in an optical recording and reproducing apparatus for recording and reproducing information on a recordable, optical record medium including preinformation such as address information in a prepit form.

2. Description of the Related Art

Generally, address information and reference signals for generating clock signals used for the recording operation and the reproducing operation are previously recorded on a recordable, optical record medium in a prepit or pregroove form to enable information to be recorded on the optical record medium in an unrecorded state. For example, in each pregroove of an area in which the information to be essentially recorded, such as video data or audio data, is recorded as record pits and a land portion of an area between the pregrooves, prepits, which will be hereinafter referred to as land prepits (LPP), are recorded on DVD-R (Digital Versatile Disc—Recordable) actively developed in recent years as a record medium capable of recording information about seven times larger than a CD (Compact Disc). The LPP is formed on a line perpendicular to the tangential direction of the pregroove so as not to exist in the adjacent land with the pregroove between.

To detect an LPP, reflected light of a light beam applied to a pregroove is received at a light reception element divided into two parts by a division line optically parallel to the tangential direction of at least the pregroove and the difference between output signals from the areas of the light reception element (divisional portions) in the direction perpendicular to the pregroove is calculated, then the LPP is detected as a binary signal provided by comparing the differential signal with a predetermined threshold value (the binary signal will be hereinafter referred to as LPP signal) More particularly, as shown in FIG. 4, reflected light from DVD-R (not shown) is received at light reception means divided into a first divisional light reception part 1a and a second divisional light reception part 1b by a division line 1 optically parallel to the tangential direction of an information track of the DVD-R. First and second light reception signals output from the first and second divisional light reception parts 1a and 1b are amplified by amplifiers 2 and 3 respectively and are input to a radial push-pull generation circuit 4 made of a differential amplifier. If the record medium is an optical disc, the divisional areas of the light reception element are formed along the radial direction of the disc by the above-mentioned division line and therefore the differential signal is called a radial push-pull signal.

The reason why an LPP can be thus detected based on the radial push-pull signal is that the LPP is formed so as not to exist in the adjacent land on the line perpendicular to the tangential direction of the pregroove, as described above. That is, when a light beam is applied to one pregroove, the reflected light from the lands on both sides of the pregroove does not contain an LPP reflection component at the same time (LPP component is contained only in the reflected light from either of the lands) and thus only the reflected light component of the LPP is extracted by calculating the difference as mentioned above. Usually, however, only either of the both polar components (for example, positive polar component) is extracted by calculating the difference.

The provided differential signal is further input to an LPP detector 5 and is compared with a predetermined threshold value. The binary signal resulting from comparing the differential signal with the threshold value is the LPP signal.

If the environment in which a recording and reproducing apparatus for recording and reproducing information on a record medium, comprising the prepit detection unit changes and optical axis fluctuation occurs in a laser oscillator or a pickup contains optical aberration, the light quantity of the light beam output by the pickup goes out of balance. The light quantity of reflected light from DVD-R incident on the light reception element may get out of balance in the radial direction because the reflected light quantity goes out of balance because of the inner and outer periphery difference in reflection factor of the disc in addition to the above-described cause during recording onto the record medium.

In this case, the record pit component may not completely be canceled simply by generating the radial push-pull signal of a reproduction signal. Resultantly, a differential signal occurs in the push-pull signal of a read signal at a place where LPP does not essentially exist on the record medium, and a pseudo-LPP signal as if LPP existed at the place appears as radial push-pull signal output. Resultantly, a CPU recognizes the pseudo-signal as false preformat data and uses it for address retrieval and machine control, resulting in malfunction of the whole apparatus.

More particularly, during recording onto a record medium, RF signals provided in the first divisional light reception area 1a and the second divisional light reception area 1b ideally become signal waveforms as shown in FIGS. 7A and 7B. That is, the RF signals A and B have signal waveforms of the same amplitude on the same reference potential ("0" in FIGS. 7A and 7B) in other than the LPP existence portion, and LPP components appear in the mutually inverted polarity directions because of the LPP in the LPP existence portion. When the RF signals A and B pass through the radial push-pull generation circuit 4, a differential signal shown in FIG. 7C is provided, and is compared with a predetermined threshold value (horizontal dotted line shown in FIG. 7C) by the LPP detection circuit 5, whereby an LPP signal is extracted. However, if an offset occurs relative to the reference potential for the RF signals provided in the first divisional light reception area 1a and the second divisional light reception area 1b, and the RF signals differ in amplitude like signal waveforms shown in FIGS. 7D and 7E because of the above-described causes, etc., the differential signal provided by the radial push-pull generation circuit 4 has a value not essentially existing because of the offset potential and RF signal amplitude differences as shown in FIG. 7F. If the differential signal F is compared with a predetermined threshold value (horizontal dotted line shown in FIG. 7F) by the LPP detector 5, an erroneous LPP signal is extracted.

SUMMARY OF THE INVENTION

It is therefore an object of the invention to provide a prepit detection unit capable of extracting an LPP signal accurately in such a record medium with variations in reflected light quantity in the radial direction or an apparatus for recording and reproducing information on a record medium.

To achieve the above object, according to the invention, there is provided a prepit detection unit for applying a light beam to an information record track of an optical record medium comprising the information record track for recording record information and a guide track for guiding the light beam into the information record track with a prepit for holding preinformation, formed on the guide track, receiving reflected light of the applied light beam at light reception means being divided into a first divisional light reception part and a second divisional light reception part by a division line optically parallel to a tangential direction of the information record track, calculating a difference between a first read signal output from the first divisional light reception part and a second read signal output from the second divisional light reception part by a differential device, and detecting the prepit based on a differential signal output from the differential device, wherein the differential device comprises first signal potential correction means for causing a recorded portion potential of the first read signal and a recorded portion potential of the second read signal to match a first reference potential, and second signal potential correction means for causing an unrecorded portion potential of the first read signal and an unrecorded portion potential of the second read signal to match a second reference potential, and calculates the difference between the first read signal and the second read signal corrected by the first and second signal potential correction means.

BRIEF DESCRIPTION OF THE DRAWINGS

In the accompanying drawings:

FIGS. 2A to 2E are timing charts to represent signals at the recording time on an optical record medium;

DETAILED DESCRIPTION OF THE PREFERRED EMBODIMENTS

Referring now to the accompanying drawings, there are shown preferred embodiments of the invention.

First, the structure of DVD-R will be described with reference to FIG. 5.

Figure 5:
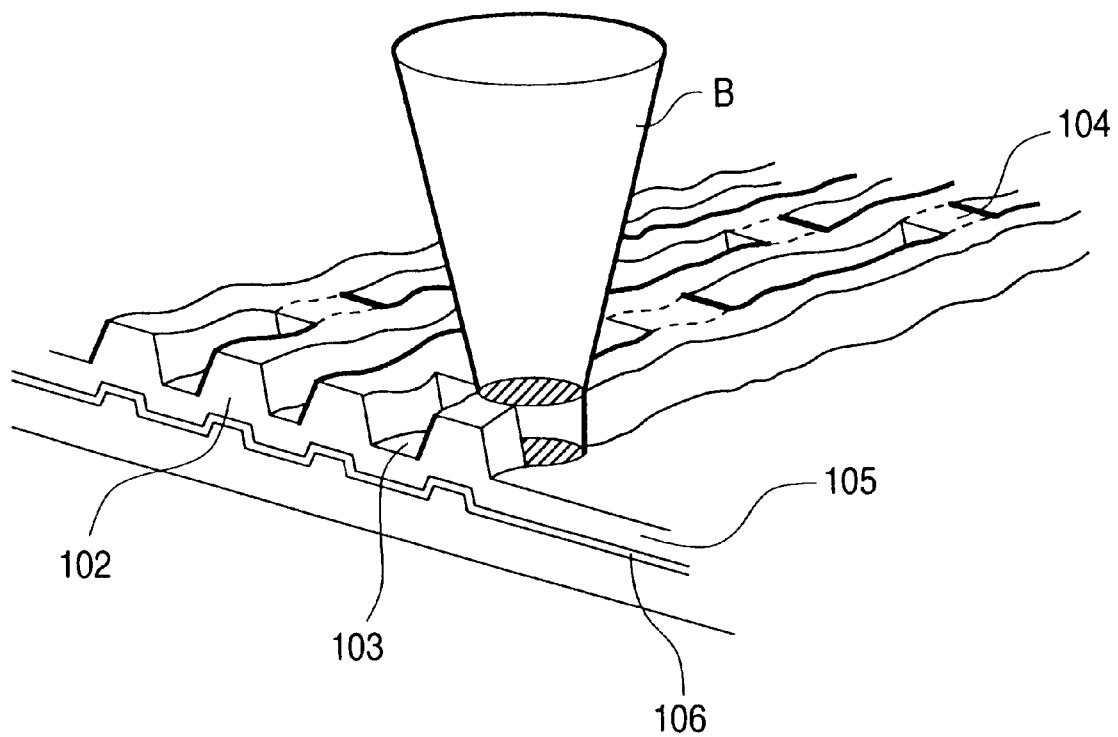
FIG. 5 is a view to show an example of DVD-R with a prepit formed on a land track.

In FIG. 5, DVD-R is dye DVD-R comprising a dye layer 105 onto which information can be written only once; it is formed with pregrooves 102 where record information is to be recorded and lands 103 for guiding a light beam B such as a laser beam as reproduction light or record light into the pregrooves 102. The DVD-R also comprises a protective film for protecting the pregrooves and the lands and a reflective layer 106 for reflecting the light beam B when the recorded information is reproduced. The lands 103 are formed with LPPs 104.

Further, in the DVD-R, the pregroove 102 is wobbled at the frequency corresponding to the rotation speed of the DVD-R. To record record information (information such as image information to be essentially recorded except preinformation or a synchronizing signal) on the DVD-R, the wobbling frequency of the pregroove 102 is detected in an information recorder, whereby the synchronizing signal is obtained, the DVD-R is rotated and controlled at a predetermined speed, and LPPs 104 are detected, whereby the preinformation is previously obtained, optimum output of the light beam B as record light and the like are set based on the :preinformation, and address information indicating the position on the DVD-R where the record information is to be recorded and the like are obtained, then the record information is recorded at the corresponding position based on the address information.

When the record information is recorded, the light beam B is applied to the pregroove 102 so that the center of the light beam B matches the center of the pregroove 102, and record information pits corresponding to the record information are formed on the pregroove 102, whereby the record information is recorded. At this time, the light spot is set to a size such that a part of the light spot is applied not only to the pregroove 102, but also to the land 103, as shown in FIG. 5. The reflected light of the part of the light spot applied to the land 103 is used to detect the preinformation from the LPP 104 by a push-pull method for obtaining the preinformation, and the reflected light of the light spot applied to the pregroove 102 is used to detect a wobbling signal from the pregroove 102 for obtaining a clock signal for rotation control.

Figure 6:
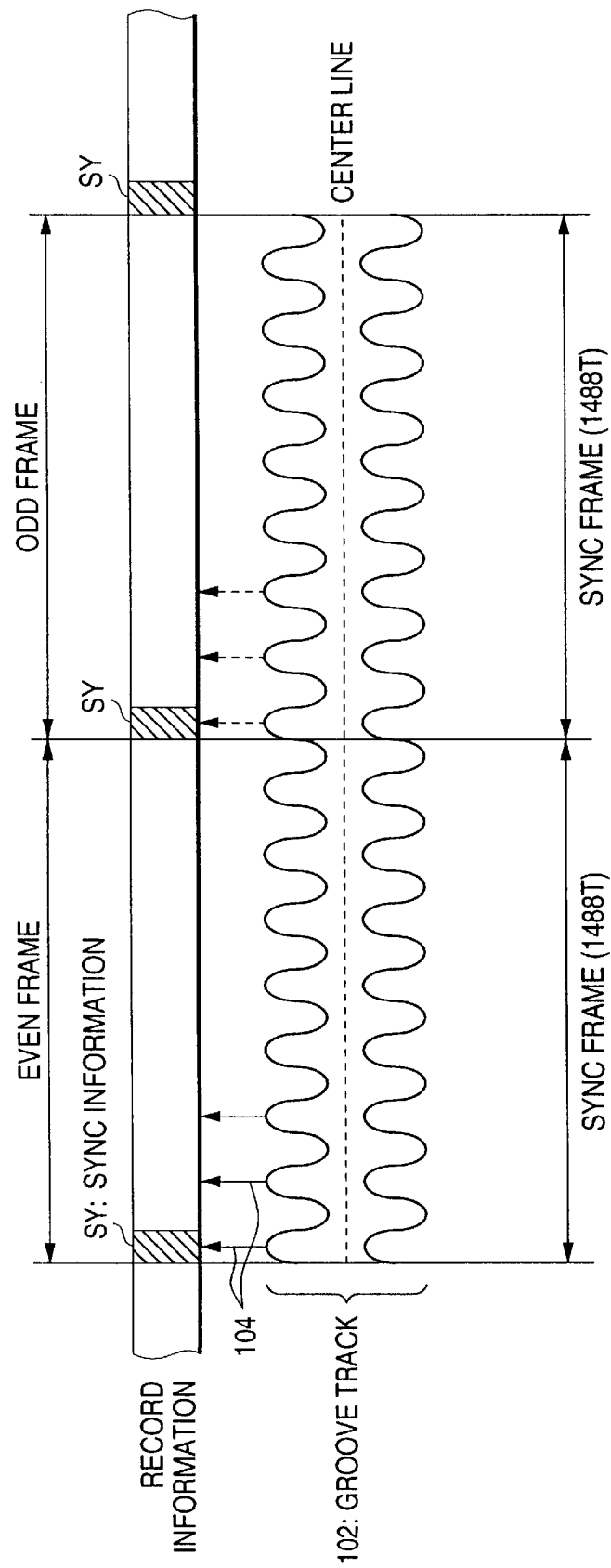
FIG. 6 is a diagram to show a record format on DVD-R in the embodiment.
Figure 7A:
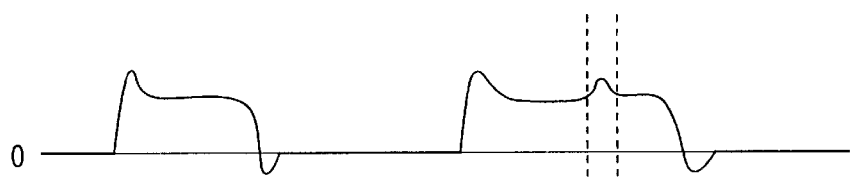
FIGS. 7A to 7F are timing charts to represent signals at the recording time on an optical record medium.
Figure 7B:
Figure 7C:
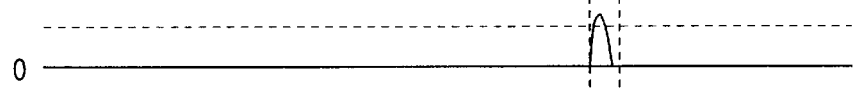
Figure 7D:
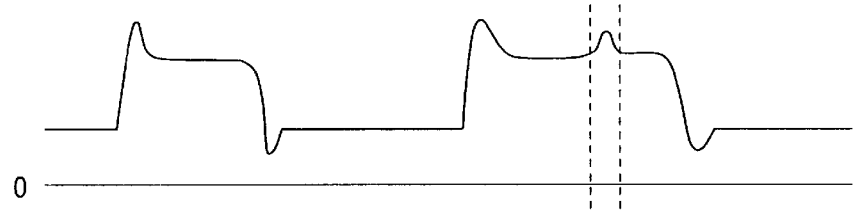
Figure 7E:
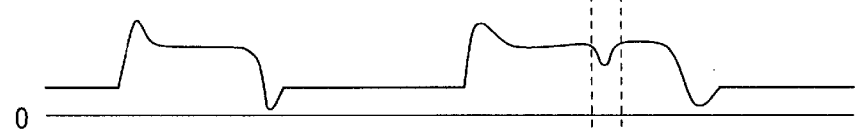
Figure 7F:
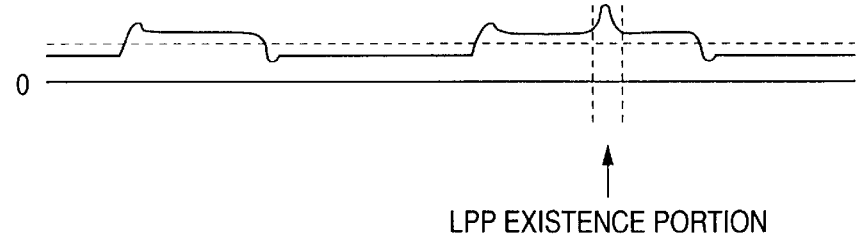

Next, the record format of the preinformation and rotation control information previously recorded on the DVD-R will be described with reference to FIG. 6. In the figure, the record format in record information is shown at the upper stage and the wave-shaped waveform at the lower stage shows the wobbling state of the pregroove for recording the record information (plan view of the pregroove 102); upward arrows between the record information and the wobbling state of the pregroove 102 schematically indicate the positions where LPPs 104 are formed. In FIG. 6, for easy understanding, the wobbling state of the pregroove 102 is shown with a larger amplitude than the actual one, and the record information is recorded on the center line of the pregroove 102.

As shown in FIG. 6, the record information to be recorded on the DVD-R is previously divided every sync frame. One record sector as an information unit is made up of 26 sync frames and one ECC block as an information block is made up of 16 record sectors. One sync frame has a length (1488T) 1488 times the unit length (T) corresponding to the pit interval stipulated in accordance with the record format for recording the record information, and synchronization information SY for synchronizing every sync frame is recorded in the portion of the 14T length of the top of the sync frame.

On the other hand, the preinformation to be recorded on the DVD-R is recorded every sync frame. To record the preinformation with LPPs 104, one LPP 104 is always formed as a pit indicating the synchronizing signal in the preinformation on the land 103 adjoining the record area of the synchronization information SY in each sync frame in the record information, and two or one LPP 104 are formed as pits or a pit indicating the contents (address information) of the preinformation to be recorded in the land 103 adjoining the first half in the sync frame other than the synchronization information SY (for the first half in the sync frame other than the synchronization information SY, LPP 104 may not be formed depending on the contents of the preinformation to be recorded. In the top sync frame of one record sector, three LPPs 104 are always formed continuously in the first half of the top sync frame.) At the time, in one record sector, the LPPs 104 are formed only in even'th sync frames (simply, even frames) or odd'th sync frames (simply, odd frames) for recording the preinformation. That is, in FIG. 6, if the LPPs 104 are formed in the even frame (as indicated by solid upward arrows in the figure), no LPPs 104 are formed in the odd frame adjacent to the even frame.

Further, for the relationship between wobbling of the pregroove 102 and the LPP 104, the LPP 104 is formed at the position of the maximum amplitude in the wobbling.

On the other hand, the pregroove 102 is wobbled at a constant wobbling frequency f0 of 140 kHz (one sync frame corresponds to eight waves of the fluctuation waveform of the pregroove 102) over all sync frames. In the information recorder, the constant wobbling frequency f0 is detected, whereby the synchronizing signal for rotation control of a spindle motor (not shown) for rotating the DVD-R is detected.

Next, a preferred embodiment for a prepit detection unit of the invention will be described with reference to FIGS. 1 to 3.

Figure 1:
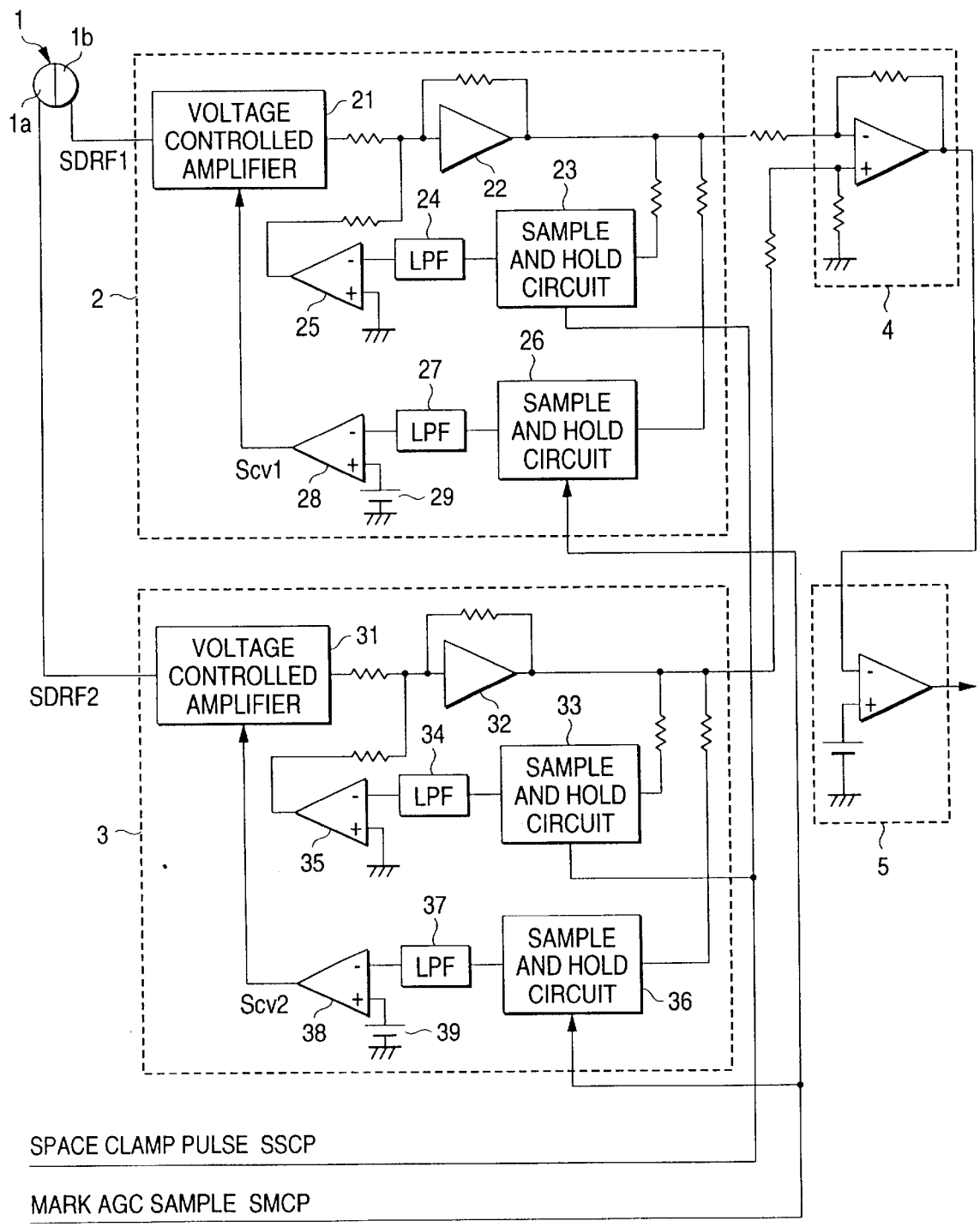
FIG. 1 is a block diagram of a prepit detection unit in one embodiment of the invention.

FIG. 1 is a general block diagram of the prepit detection unit in the embodiment of the invention.

As shown in FIG. 1, the prepit detection unit in the embodiment comprises a pickup 1 for applying a record beam to an information record side of DVD-R (not shown) rotated by a spindle motor (not shown), receiving reflected light of the applied record beam from the information record side at a light reception element divided into two parts at least in a direction optically parallel to the tangential direction of a pregroove on the DVD-R (the parts into which the light reception element is divided will be hereinafter referred to as a first divisional light reception part 1a and a second divisional light reception part 1b), and outputting electric signals responsive to the light quantities of the reflected light received at the first divisional light reception part 1a and the second divisional light reception part 1b as a first divisional RF signal SDRF1 and a second divisional RF signal SDRF2, a potential correction circuit 2 for correcting the potential difference between recorded and unrecorded portions of the first divisional RF signal SDRF1, a potential correction circuit 3 for correcting the potential difference between recorded and unrecorded portions of the second divisional RF signal SDRF2, a radial push-pull circuit 4 of a differential device for generating a radial push-pull signal Srpp as a differential signal from the first and second divisional RF signals SDRF1 and SDRF2 with the potentials corrected, and a prepit detection circuit S for comparing the generated radial push-pull signal Srpp with a predetermined reference level, thereby binarizing the signal and detecting the binary signal as an LPP signal. The LPP signal output from the prepit detection circuit 5 is decoded by a decoder (not shown) and is extracted as address information carried on the LPP signal.

A voltage controlled amplifier 21 and an amplifier 22 make up a gain variable amplifier. A sample and hold circuit 23 receives a space clamp pulse SSCP described later and samples a space section in the first divisional RF signal SDRF1 (period in which a record pit is not formed). That is, the first divisional RF signal SDRF1 is output from the sample and hold circuit 23 only while the space clamp pulse signal SSCP which is high indicating a space section is supplied. A low-pass filter 24 removes the high-frequency component of the first divisional RF signal SDRF1 output from the sample and hold circuit 23 and smoothes the signal. A differential amplifier 25 has a noninversion terminal grounded and an inversion terminal to which the first divisional RF signal SDRF1 smoothed and output through the low-pass filter 24 is input. Resultantly, the differential amplifier 25 outputs a differential voltage for 0 V of the first divisional RF signal SDRF1 smoothed and feeds the voltage back into the amplifier 22. Such a configuration is adopted, whereby the space section of the first divisional RF signal SDRF1 is clamped to 0 V (second reference potential).

On the other hand, a sample and hold circuit 26 receives a mark section clamp pulse SMCP described later and samples the mark section in the signal SDRF1 (section in which a record pit is formed). That is, the first divisional RF signal SDRF1 is output from the sample and hold circuit 26 only while the mark clamp pulse signal SMCP indicating a mark section is supplied. A low-pass filter 27 removes the high-frequency component of the first divisional RF signal SDRF1 output from the sample and hold circuit 26 and smoothes the signal. A differential amplifier 28 has a noninversion terminal to which output of a constant-voltage power supply 29 (constant voltage Ve (first reference potential)) is connected and an inversion terminal to which the first divisional RF signal SDRF1 smoothed and output through the low-pass filter 27 is input. Resultantly, the differential amplifier 28 outputs a differential voltage for the constant voltage Ve of the first divisional RF signal SDRF1 smoothed. This is the voltage control signal SCV1 of the voltage controlled amplifier 21 described above.

The potential correction circuit 3 has an almost similar circuit configuration to that of the potential correction circuit 2 described above and fixes the space section of the second divisional RF signal SDRF2 to 0 V and the mark section to the constant voltage Ve.

That is, the mark and space to be recorded on the DVD-R are a record NRZI (Non Return to Zero Invert) signal as shown in FIG. 2A; when they are recorded on the DVD-R, they are recorded according to write strategy pulse train output shown in FIG. 2B generated in accordance with the NRZI so that crosstalk is not increased at the read time with a pit shape formed. In the actual RF signal during recording, the amplitude potential does not stabilize in the portion after the transition from the mark portion to the space portion or from the space portion to the mark portion as shown in FIG. 2C. Therefore, as shown in FIGS. 2D and 2E, a mark AGC sample pulse for sampling the portion in which the amplitude potential in the mark portion of the RF signal stabilizes (in the embodiment, V2) and a space section clamp pulse for clamping the portion in which the amplitude potential of the RF signal in the space section stabilizes (in the embodiment, V1) are generated and are fed into the sample and hold circuits 23 and 26 or 33 and 36 of the potential correction circuit, whereby the voltage V1 in the space section is fixed to 0 V and the voltage V2 in the mark section is fixed to Vc, whereby it is made possible to strike a balance between the amplitude differences between the marks and spaces of the first and second divisional RF signals SDRF1 and SDRF2. Therefore, the first and second divisional RF signals output through the potential correction circuits are input to the radial push-pull circuit 4, whereby only the RF signal component is canceled and stable LPP extraction can be executed.

Figure 8A:
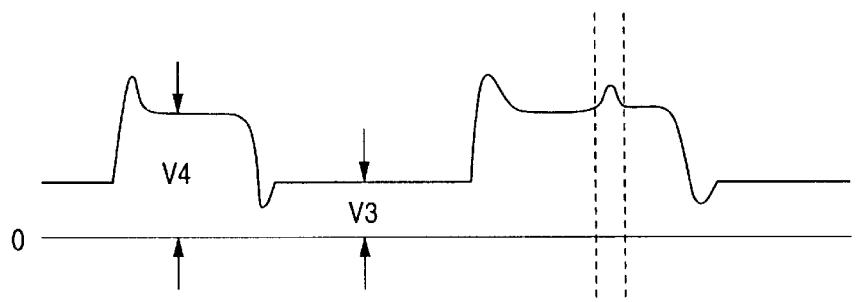
FIGS. 8A to 8E are timing charts to represent signals at the recording time on the optical record medium.
Figure 8B:
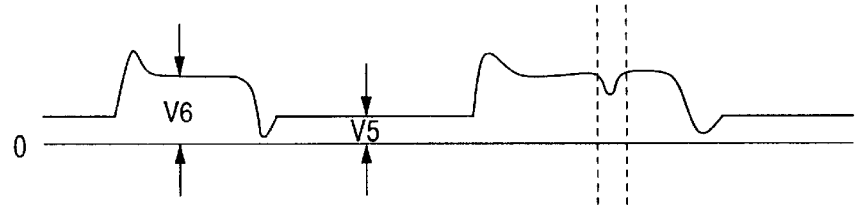
Figure 8C:
Figure 8D:
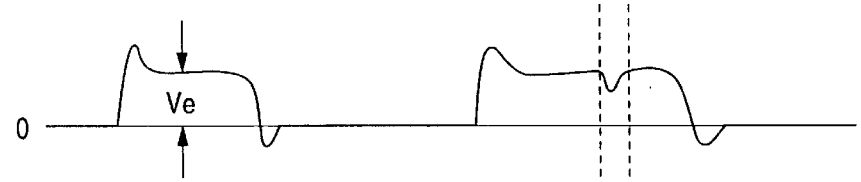
Figure 8E:
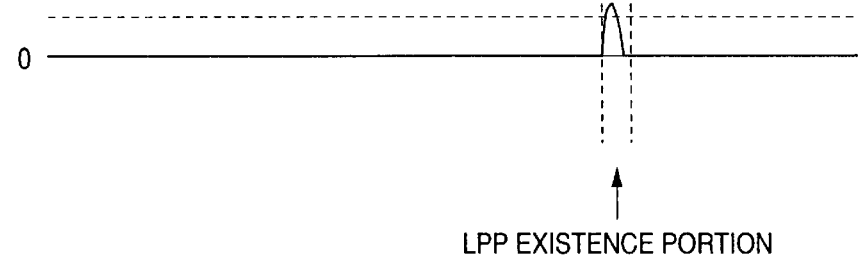

More particularly, assume that the first and second divisional RF signals SDRF1 and SDRF2 have different offset components (V3 and V5) relative to the reference potential ("0" in FIGS. 8A to 8E) and different amplitudes (V4 and V6) as shown in FIGS. 8A and 8B. For the first and second divisional RF signals SDRF1 and SDRF2, the voltages V3 and V5 in the space sections (offset components) are clamped to 0 V by the action of the sample and hold circuits 23 and 33, the low-pass filters 24 and 34, the differential amplifiers 25 and 35, and the amplifiers 22 and 32, so that the offset components are removed, as shown in FIGS. 8C and 8D. Further, the voltages in the mark sections are clamped to Ve by the action of the sample and hold circuits 26 and 36, the low-pass filters 27 and 37, the differential amplifiers 28 and 38, and the voltage controlled amplifiers 21 and 31, so that the first and second divisional RF signals SDRF1 and SDRF2 also match in amplitude. If the differential signal between the first divisional RF signal C and the second divisional RF signal D thus corrected are input to the radial push-pull circuit 4, a differential signal shown in FIG. 8E is provided, and the LPP detection circuit 5 compares the differential signal with a predetermined threshold value (horizontal dotted line shown in FIG. 8E), whereby it is made possible to extract a stable LPP signal.

Figure 3:
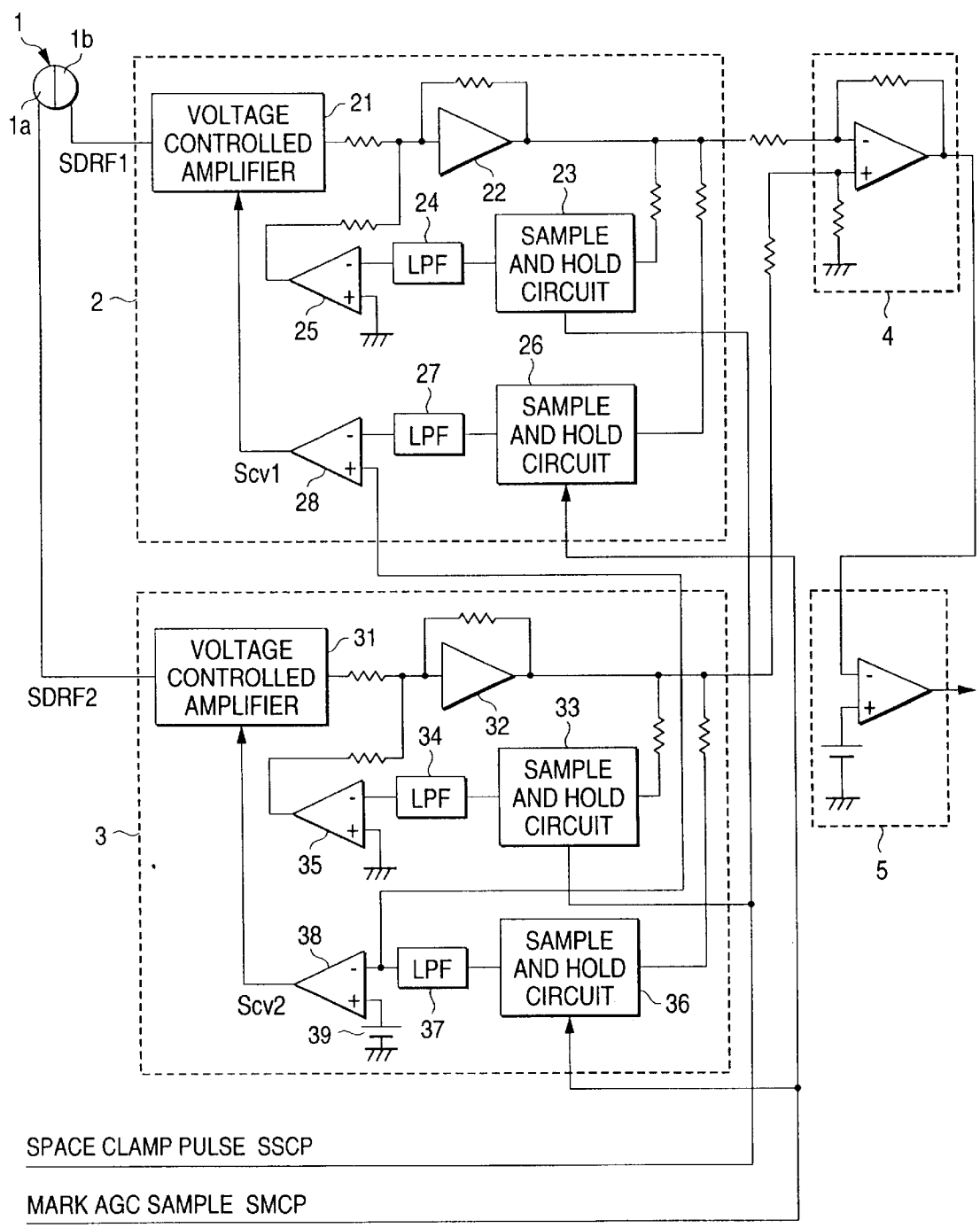
FIG. 3 is a block diagram of a prepit detection unit in another embodiment of the invention.
Figure 4:
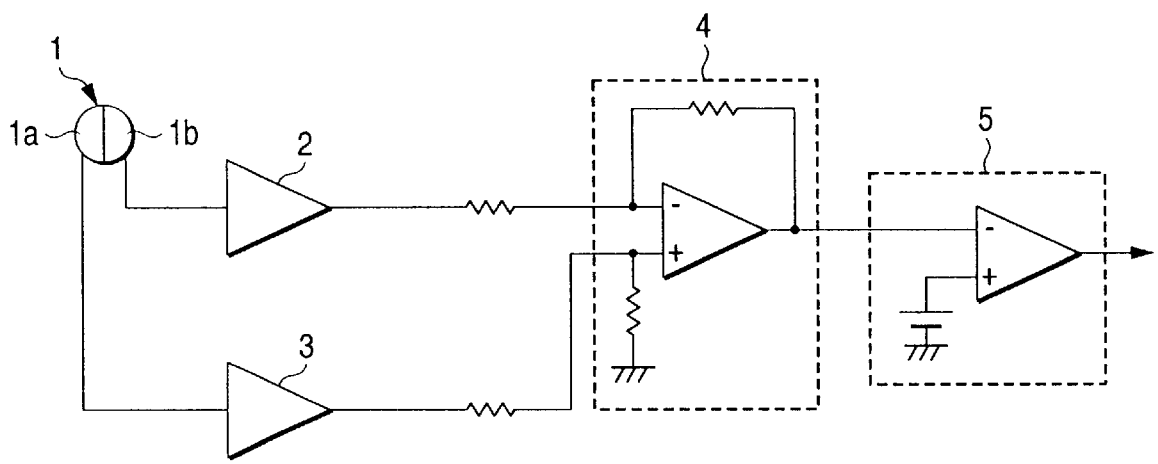
FIG. 4 is a block diagram of a conventional prepit detection unit.

FIG. 3 shows another embodiment of the invention. In the embodiment, a sample potential in a mark section of a second divisional RF signal supplied to an inversion input terminal of a differential amplifier 38 is input directly to a noninversion input terminal of a differential amplifier 28. The mark section of the signal SDRF2 signal input to the inversion input terminal of the differential amplifier 38 is clamped so as to match voltage Ve of a constant voltage power supply 39 as previously described. Therefore, the voltage input to the noninversion input terminal of the differential amplifier 28 matches the voltage Ve of the constant voltage power supply 39 in the end.

If such a configuration is adopted, even if the voltage Ve of the constant voltage power supply 39 varies with time, etc., the voltages input to the noninversion terminals of the differential amplifiers 28 and 38 always match, thus it is made possible to stably correct the potentials in the mark sections of a first divisional RF signal SDRF1 and the second divisional RF signal SDRF2 to the same amplitude. Resultantly, it is made possible for a radial push-pull circuit 4 to stably cancel only the RF signal component.

Thus, according to the invention, there is provided a prepit detection unit for applying a light beam to an information record track of an optical record medium comprising the information record track for recording record information and a guide track for guiding the light beam into the information record track with a prepit for holding preinformation, formed on the guide track, receiving reflected light of the applied light beam at light reception means being divided into a first divisional light reception part and a second divisional light reception part by a division line optically parallel to a tangential direction of the information record track, calculating a difference between a first read signal output from the first divisional light reception part and a second read signal output from the second divisional light reception part by a differential device, and detecting the prepit based on a differential signal output from the differential device. The differential device comprises first signal potential correction means for causing a recorded portion potential of the first read signal and a recorded portion potential of the second read signal to match a first reference potential, and second signal potential correction means for causing an unrecorded portion potential of the first read signal and an unrecorded portion potential of the second read signal to match a second reference potential, and calculates the difference between the first read signal and the second read signal corrected by the first and second signal potential correction means. Thus, the difference between the corrected read signals matching in the recorded portion and unrecorded portion potentials can be found and can be extracted as an accurate LPP signal.

What is claimed is:

1. A prepit detection unit for reading an optical record medium having an information record track, a guide track, and a prepit including pre-information recorded on the guide track, the prepit detection unit comprising:
   a light reception element having a first light reception part and a second light reception part divided at least by a division line optically parallel with a tangential direction of the information record track, wherein the first light reception part outputs a first read signal and the second light reception part outputs a second read signal;
   a potential correction circuit comprising
      a first correction circuit which produces at least part of a corrected first read signal by adjusting a recorded portion potential of the first read signal to correspond to a first reference potential; and
      a second correction circuit which produces at least part of a corrected second read signal by adjusting a recorded portion potential of the second read signal to correspond to the first reference potential;
   a difference circuit that generates a difference signal based on the corrected first read signal and the corrected second read signal, and
   a prepit detection circuit for detecting the prepit based on the difference signal.

2. The prepit detection unit according to claim 1, wherein said first correction circuit comprises:
   a first potential extraction circuit for extracting the recorded portion potential of the first read signal to produce a first extracted recorded portion potential;
   a first filter for removing the high-frequency component from the first extracted recorded portion potential to produce a first filtered signal;
   a first differential circuit for comparing the first filtered signal with the first reference potential to produce a first differential signal; and
   a first potential adjustment circuit for adjusting the recorded portion potential of the first read signal based on the first differential signal.

3. The prepit detection unit according to claim 2, wherein said second correction circuit comprises:
   a second potential extraction circuit for extracting the recorded portion potential of the second read signal to produce a second extracted recorded portion potential;
   a second filter for removing the high-frequency component from second extracted recorded portion potential to produce a second filtered signal;
   a second differential circuit for comparing the second filtered signal with the first reference potential to produce a second differential signal; and
   a second potential adjustment circuit for adjusting the recorded portion potential of the second read signal based on the second differential signal.

4. The prepit detection unit according to claim 1, wherein said potential correction circuit further comprises:
   a third correction circuit which produces at least part of the corrected first read signal by adjusting an unrecorded portion potential of the first read signal to correspond to a second reference potential; and
   a fourth correction circuit which produces at least part of the corrected second read signal by adjusting an unrecorded portion potential of the second read signal to correspond to the second reference potential.

5. The prepit detection unit according to claim 4, wherein said second reference potential is a ground potential and wherein the first reference potential is different than the second reference potential.

6. The prepit detection unit according to claim 4, wherein said third correction circuit comprises:
a first potential extraction circuit for extracting the unrecorded portion potential of the first read signal to produce a first extracted unrecorded portion potential;
a first filter for removing the high-frequency component from the first extracted unrecorded portion potential to produce a first filtered signal;
a first differential circuit for comparing the first filtered signal with the second reference potential to produce a first differential signal; and
a first potential adjustment circuit for adjusting the unrecorded portion potential of the first read signal based on the first differential signal.

7. The prepit detection unit according to claim 6, wherein said fourth correction circuit comprises:
a second potential extraction circuit for extracting the unrecorded portion potential of the second read signal to produce a second extracted unrecorded portion potential;
a second filter for removing the high-frequency component from the second extracted unrecorded portion potential to produce a second filtered signal;
a second differential circuit for comparing the second filtered signal with the second reference potential to produce a second differential signal; and
a second potential adjustment circuit for adjusting the unrecorded portion potential of the second read signal based on the second differential signal.

8. The prepit detection unit according to claim 3, wherein said potential correction circuit further comprises:
a third correction circuit which produces at least part of the corrected first read signal by adjusting an unrecorded portion potential of the first read signal to correspond to a second reference potential; and
a fourth correction circuit which produces at least part of the corrected second read signal by adjusting an unrecorded portion potential of the second read signal to correspond to the second reference potential.

9. The prepit detection unit according to claim 8, wherein said third correction circuit comprises:
a third potential extraction circuit for extracting the unrecorded portion potential of the first read signal to produce a first extracted unrecorded portion potential;
a third filter for removing the high-frequency component from the first extracted unrecorded portion potential to produce a third filtered signal;
a third differential circuit for comparing the third filtered signal with the second reference potential to produce a third differential signal; and
a third potential adjustment circuit for adjusting the unrecorded portion potential of the first read signal based on the third differential signal, and wherein fourth correction circuit comprises:
a fourth potential extraction circuit for extracting the unrecorded portion potential of the second read signal to produce a second extracted unrecorded portion potential;
a fourth filter for removing the high-frequency component from the second extracted unrecorded portion potential to produce a fourth filtered signal;
a fourth differential circuit for comparing the fourth filtered signal with the second reference potential to produce a fourth differential signal; and
a fourth potential adjustment circuit for adjusting the unrecorded portion potential of the second read signal based on the fourth differential signal.

10. The prepit detection unit according to claim 9, wherein said second reference potential is a ground potential and is different than said first reference potential.

11. A prepit detection unit for reading an optical record medium having an information record track, a guide track, and a prepit including pre-information recorded on the guide track, the prepit detection unit comprising:
a light reception element having a first light reception part and a second light reception part divided at least by a division line optically parallel with a tangential direction of the information record track, wherein the first light reception part outputs a first read signal and the second light reception part outputs a second read signal;
a potential correction circuit,
wherein the potential correction circuit generates a corrected first read signal by causing a recorded portion potential of the first read signal to correspond to a first reference potential, and
wherein the potential correction circuit generates a corrected second read signal by causing a recorded portion potential of the second read signal to correspond to the first reference potential;
a difference circuit for generating a difference signal between the corrected first read signal and the corrected second read signal; and
a prepit detection circuit for detecting the prepit based on the difference signal.

12. The prepit detection unit according to claim 11, wherein said potential correction circuit comprises:
a first potential extraction circuit for extracting the recorded portion potential of the first read signal to produce a first extracted recorded portion potential;
a first filter for removing the high-frequency component from the first extracted recorded portion potential to produce a first filtered signal;
a first differential circuit for comparing the first filtered signal with the first reference potential and producing a first differential signal; and
a first potential adjustment circuit for adjusting the recorded portion potential of the first read signal based on the first differential signal.

13. The prepit detection unit according to claim 12, wherein said potential correction circuit comprises:
a second potential extraction circuit for extracting the recorded portion potential of the second read signal to produce a second extracted recorded portion potential;
a second filter for removing the high-frequency component from the second extracted recorded portion potential to produce a second filtered signal;
a second differential circuit for comparing the second filtered signal with the first reference potential and producing a second differential signal; and
a second potential adjustment circuit for adjusting the recorded portion potential of the second read signal based on the second differential signal.

14. The prepit detection unit according to claim 11, wherein said potential correction circuit further causes an unrecorded portion potential of the first read signal and an unrecorded portion potential of the second read signal to correspond to a second reference potential.

15. The prepit detection unit according to claim 13, wherein said potential correction circuit further causes an unrecorded portion potential of the first read signal and an unrecorded portion potential of the second read signal to correspond to a second reference potential.

16. The prepit detection unit according to claim 14, wherein said second reference potential is a ground potential and is different than the first reference potential.

17. The prepit detection unit according to claim 15, wherein said second reference potential is a ground potential and is different than the first reference potential.

18. The prepit detection unit according to claim 15, wherein said potential correction circuit further comprises:
   a third potential extraction circuit for extracting the unrecorded portion potential of the first read signal to produce a first extracted unrecorded portion potential;
   a third filter for removing the high-frequency component from the first extracted unrecorded portion potential to produce a third filtered signal;
   a third differential circuit for comparing the third filtered signal with the second reference potential to produce a third differential signal; and
   a third potential adjustment circuit for adjusting the unrecorded portion potential of the first read signal based on the third differential signal.

19. The prepit detection unit according to claim 18, wherein said potential correction circuit further comprises:
   a fourth potential extraction circuit for extracting the unrecorded portion potential of the second read signal to produce a second extracted unrecorded portion potential;
   a fourth filter for removing the high-frequency component from the second extracted unrecorded portion potential to produce a fourth filtered signal;
   a fourth differential circuit for comparing the fourth filtered signal with the second reference potential to produce a fourth differential signal; and
   a fourth potential adjustment circuit for adjusting the unrecorded portion potential of the second read signal based on the fourth differential signal.

20. The prepit detection unit according to claim 19, wherein said second reference potential is a ground potential and is different than said first reference potential.

21. The prepit detection unit according to claim 14, wherein said potential correction circuit further comprises:
   a first potential extraction circuit for extracting the unrecorded portion potential of the first read signal to produce a first extracted unrecorded portion potential;
   a first filter for removing the high-frequency component from the first extracted unrecorded portion potential to produce a first filtered signal;
   a first differential circuit for comparing the first filtered signal with the second reference potential to produce a first differential signal; and
   a first potential adjustment circuit for adjusting the unrecorded portion potential of the first read signal based on the first differential signal.

22. The prepit detection unit according to claim 21, wherein said potential correction circuit further comprises:
   a second potential extraction circuit for extracting the unrecorded portion potential of the second read signal to produce a second extracted unrecorded portion potential;
   a second filter for removing the high-frequency component from the second extracted unrecorded portion potential to produce a second filtered signal;
   a second differential circuit for comparing the second filtered signal with the second reference potential to produce a second differential signal; and
   a second potential adjustment circuit for adjusting the unrecorded portion potential of the second read signal based on the second differential signal.

23. The prepit detection unit according to claim 22, wherein said second reference potential is a ground potential and is different than said first reference potential.

* * * * *